US012065576B2

(12) United States Patent
Lenaerts et al.

(10) Patent No.: US 12,065,576 B2
(45) Date of Patent: Aug. 20, 2024

(54) AQUEOUS INKJET INK SETS

(71) Applicant: AGFA NV, Mortsel (BE)

(72) Inventors: Jens Lenaerts, Mortsel (BE); Lionel Petton, Mortsel (BE); Sonny Wynants, Mortsel (BE)

(73) Assignee: Agfa NV, Mortsel (BE)

(*) Notice: Subject to any disclaimer, the term of this patent is extended or adjusted under 35 U.S.C. 154(b) by 265 days.

(21) Appl. No.: 17/609,300

(22) PCT Filed: Apr. 30, 2020

(86) PCT No.: PCT/EP2020/061988
§ 371 (c)(1),
(2) Date: Nov. 5, 2021

(87) PCT Pub. No.: WO2020/225073
PCT Pub. Date: Nov. 12, 2020

(65) Prior Publication Data
US 2022/0220329 A1    Jul. 14, 2022

(30) Foreign Application Priority Data

May 7, 2019  (EP) ..................................... 19172873

(51) Int. Cl.
*C09D 11/40*    (2014.01)
*B41J 2/14*     (2006.01)
(Continued)

(52) U.S. Cl.
CPC .......... *C09D 11/40* (2013.01); *B41J 2/14201* (2013.01); *B41J 11/0024* (2021.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 6,924,327 B2 * | 8/2005 | Sano ..................... C09D 11/322 523/160 |
| 7,399,351 B2 * | 7/2008 | Jackson ................. C09D 11/40 106/31.6 |

(Continued)

FOREIGN PATENT DOCUMENTS

| DE | 10-2016-203528 A1 | 9/2017 |
| EP | 2582527 B1 | 3/2014 |

(Continued)

OTHER PUBLICATIONS

European Patent Office, International Search Report in International Patent Application No. PCT/EP2020/061988, mailed Jul. 22, 2020, 4 pp.

(Continued)

*Primary Examiner* — Manish S Shah
(74) *Attorney, Agent, or Firm* — Leydig, Voit & Mayer, Ltd.

(57) ABSTRACT

An aqueous inkjet ink set for manufacturing decorative panels comprising: a) a cyan aqueous inkjet ink containing a beta-copper phthalocyanine pigment; b) a red aqueous inkjet ink containing a red pigment R and a polymeric dispersant P; c) a yellow aqueous inkjet ink containing a yellow pigment; and d) a black aqueous inkjet ink containing a carbon black pigment; wherein the red aqueous inkjet ink has a weight ratio R/P of red pigment R to polymeric dispersant P that complies with 1.2<R/P<3.0; and wherein the average particle diameter APD of the red pigment R complies with 175 nm<APD<240 nm, as determined by a dynamic light scattering technique using a laser having an emission wavelength of 633 nm and measured under a scattering angle of 90 degrees.

11 Claims, 1 Drawing Sheet

(51) Int. Cl.
| | |
|---|---|
| *B41J 11/00* | (2006.01) |
| *B41M 5/00* | (2006.01) |
| *C09D 11/033* | (2014.01) |
| *C09D 11/037* | (2014.01) |
| *C09D 11/103* | (2014.01) |
| *C09D 11/322* | (2014.01) |
| *C09D 11/324* | (2014.01) |

(52) U.S. Cl.
CPC ......... *B41M 5/0023* (2013.01); *C09D 11/033* (2013.01); *C09D 11/037* (2013.01); *C09D 11/103* (2013.01); *C09D 11/322* (2013.01); *C09D 11/324* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2005/0004263 A1* | 1/2005 | Gould | C09D 11/30 523/160 |
| 2010/0086692 A1* | 4/2010 | Ohta | C09D 11/322 427/256 |
| 2010/0330296 A1* | 12/2010 | Loccufier | C09D 11/101 522/26 |
| 2011/0091804 A1* | 4/2011 | Geisenberger | G03G 9/0918 106/31.77 |
| 2012/0208035 A1* | 8/2012 | Iwamoto | C09D 7/62 524/358 |
| 2012/0214939 A1 | 8/2012 | Li et al. | |
| 2013/0078437 A1* | 3/2013 | Symkens | B44C 1/00 428/203 |
| 2014/0036010 A1* | 2/2014 | Hasegawa | C09D 11/102 347/100 |
| 2017/0058456 A1* | 3/2017 | Loccufier | C09D 11/322 |
| 2018/0170083 A1* | 6/2018 | De Mondt | B41M 7/0081 |
| 2022/0073774 A1* | 3/2022 | Lenaerts | B32B 7/12 |

FOREIGN PATENT DOCUMENTS

| | | |
|---|---|---|
| EP | 2865528 A1 | 4/2015 |
| EP | 2763850 B1 | 7/2018 |
| EP | 3447098 A1 | 2/2019 |
| JP | 2013-001746 A | 1/2013 |

OTHER PUBLICATIONS

European Patent Office, Written Opinion in International Patent Application No. PCT/EP2020/061988, mailed Jul. 22, 2020, 6 pp.

* cited by examiner

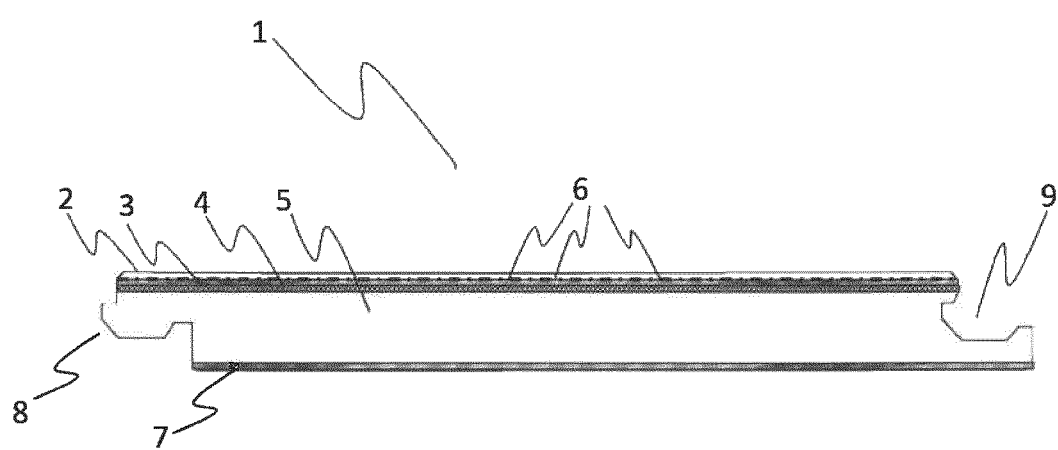

AQUEOUS INKJET INK SETS

CROSS-REFERENCE TO RELATED APPLICATIONS

This patent application is the U.S. national phase of International Patent Application No. PCT/EP2020/061988, filed Apr. 30, 2020, which claims the benefit of European Patent Application No. 19172873.2, filed May 7, 2019.

TECHNICAL FIELD

The present invention relates to aqueous inkjet ink sets for manufacturing decorative panels, such as flooring, kitchen, furniture and wall panels.

BACKGROUND ART

Decorative panels have been made by gravure printing a wood motif on a paper substrate, impregnating the printed paper substrate with a thermosetting resin and heat pressing it between a core layer, such as a MDF-plate, and a protective layer, such as a thermosetting resin impregnated paper. The heat-pressed decorative plate is then divided in decorative panels. This is illustrated, for example, by EP 2763850 A (UNILIN).

Industrial inkjet printing systems have been developed to replace gravure printing for manufacturing laminate flooring panels, allowing for just-in-time manufacturing, short production runs and personalized products. In order to achieve high productivity, single-pass inkjet printing systems have been developed as exemplified by EP 2582527 A (PADALUMA INK JET SOLUTIONS) and DE 102016203528 A (KOENIG).

The majority of laminate flooring panels have a wood motif. The use of a "standard" aqueous ink set of CMYK inks is insufficient to solve problems of true wood colour reproduction and metamerism. This has been solved by designing specific aqueous CRYK inkjet ink sets including a red inkjet ink R instead of a magenta inkjet ink M. Examples of such an inkjet ink set are disclosed by EP 2865528 A (AGFA) and EP 3447098 A (AGFA).

However, adhesion problems in the decorative panels have been observed when inkjet printing dark brown wood motifs, such as black walnut acacia, with a CRYK inkjet ink set.

Hence, there is still a need for improved aqueous inkjet ink sets for manufacturing decorative panels by inkjet that do not exhibit adhesion problems, while providing a true reproduction of wood colours without reducing the reliability of the inkjet process or the image quality of the decorative panels.

SUMMARY OF INVENTION

In order to overcome the problems described above, preferred embodiments of the present invention have been realised with an aqueous inkjet ink set as defined by claim 1.

It was surprisingly found that a specific selection of average particle diameter for the red pigment R in the red inkjet ink in combination with a specific weight ratio R/P of red pigment R to polymeric dispersant P delivered improved adhesion without impairing high printing reliability, the latter being essential in a manufacturing environment.

Further advantages and embodiments of the present invention will become apparent from the following description.

BRIEF DESCRIPTION OF DRAWINGS

FIG. 1 shows a cross-section of an embodiment of a decorative panel (1) including, in order, a protective layer (2), an outermost ink receiving layer (3), an inner ink receiving layer (4), a core layer (5) with a tongue (8) and a groove (9) and a balancing layer (7), wherein the ink receiving layers include a jetted and dried colour image (6).

DESCRIPTION OF EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Aqueous Inkjet Ink Sets

An aqueous inkjet ink set according to a preferred embodiment of the invention comprises: a) a cyan aqueous inkjet ink containing a beta-copper phthalocyanine pigment; b) a red aqueous inkjet ink containing a red pigment R and a polymeric dispersant P; c) a yellow aqueous inkjet ink containing a yellow pigment; and d) a black aqueous inkjet ink containing a carbon black pigment; wherein the red aqueous inkjet ink has a weight ratio R/P of red pigment R to polymeric dispersant P that complies with 1.2<R/P<3.0; and wherein the average particle diameter APD of the red pigment R complies with 175 nm<APD<240 nm, as determined by a dynamic light scattering technique using a laser having an emission wavelength of 633 nm and measured under a scattering angle of 90 degrees.

In printing wood motifs for decorative panels, like laminate flooring panels, red aqueous inkjet ink is generally consumed in a much higher amount compared to the other aqueous inkjet inks of the inkjet ink set. It was found that adhesion problems that occurred after heat pressing the resin impregnated inkjet printed paper substrate between a core layer and a protective layer, could be improved by reducing the amount of polymeric dispersant in the red aqueous inkjet ink. Good adhesion was surprisingly obtained when the weight ratio R/P of red pigment R to polymeric dispersant P was selected to comply with 1.2<R/P<3.0, more preferably 1.5<R/P<2.5, and most preferably 1.8<R/P<2.2 and when the average particle diameter APD of the red pigment R was selected to comply with 175 nm<APD<240 nm, more preferably 190 nm<APD<235 nm, and most preferably 200 nm<APD<230 nm.

Generally, the average particle diameter in inkjet inks is selected to be about 150 nm or smaller for obtaining good jetting reliability. Larger average particle sizes decrease the colour gamut as images printed by such inkjet inks become less transparent. The colour gamut is defined as the number of colours that can be produced by an inkjet ink set. Opaque inkjet printed images can be obtained if the average particle diameter is 260 nm or larger.

A disadvantage of a larger average particle diameter in an inkjet ink is that the dispersion stability and jetting reliability usually deteriorates. However, by controlling the weight ratio R/P and the APD of the red pigment in the described manner, a good dispersion stability and jetting reliability was achieved required for single pass inkjet printing. Single pass inkjet printing is more critical than multi-pass inkjet printing, as a single failing nozzle in a print head can destroy the image quality by having a white line defect in the image. In multi-pass inkjet, such defects are generally camouflaged by different nozzles addressing the same spot on the ink receiver during multiple passes. A further improved effect on dispersion stability and jetting reliability was achieved by adapting the viscosity of the inkjet ink to preferably 3.5 to 12.0 mPa·s, more preferably 3.8 to 8.0 mPa·s, most preferably 4.0 to 7.5 mPa·s at a temperature of 32° C. and at a shear rate of 1,000 s$^{-1}$.

Another aspect of image quality is graininess, which is especially important when printing pale colours. If pigment inkjet inks with a too high concentration of colour pigments are used, then less ink droplets have to be deposited to reach a certain pale colour, resulting in an image with high graininess. On the other side, upon reducing the amount of colour pigment in the ink too much, a lot of ink droplets need to be deposited which slows down the printing process or increases the printer cost and the energy consumption as more powerful dryers are needed.

In a preferred embodiment, the aqueous inkjet ink set was designed to have optimal pigment concentration in each inkjet ink for good image quality. In wood motifs, the required cyan ink is generally minimal or even zero and thus the pigment concentration is preferably lower compared to the other inkjet inks. Therefore, the cyan aqueous inkjet ink preferably contains 1.5 to 3.0 wt %, more preferably 1.8 to 2.5 wt % of a beta-copper phthalocyanine pigment, wherein the weight percentage (wt %) is based on the total weight of the cyan inkjet ink.

The red inkjet is usually consumed in higher amounts than the other inkjet inks. Therefore, the red aqueous inkjet ink preferably contains 2.2 to 5.0 wt %, more preferably 2.5 to 4.0 wt % of the red pigment, wherein the weight percentage (wt %) is based on the total weight of the red inkjet ink.

People look with their eyes, but see with their brain. The most visible colour for the human brain is a 550 nm yellow-green. This means that the human brain can distinguish more shades of that colour than any other. Therefore, it was found advantageous to have a higher pigment concentration in a yellow inkjet ink than in a red inkjet ink. The yellow aqueous inkjet ink preferably contains 3.0 to 5.0 wt %, more preferably 3.5 to 4.5 wt % of the yellow pigment, wherein the weight percentage (wt %) is based on the total weight of the yellow inkjet ink.

A black aqueous inkjet ink may be used in inkjet printing for under colour removal (UCR). UCR is a process of eliminating overlapping yellow, magenta, and cyan that would have added to a dark neutral black and replacing them with black ink only, during the colour separation process. It was found advantageous to have the pigment concentration in the black inkjet ink somewhat comparable to that of the red aqueous inkjet ink. The black aqueous inkjet ink preferably contains 2.2 to 5.0 wt %, more preferably 2.4 to 4.0 wt % of a carbon black pigment; wherein the weight percentage (wt %) is based on the total weight of the black inkjet ink.

In a particularly preferred embodiment, the aqueous inkjet ink set as described above complies with the relationship: wt % (cyan)<wt % (red)<wt % (yellow), wherein the wt % (cyan) is the weight percentage of the cyan pigment in the cyan aqueous inkjet ink, the wt % (red) is the weight percentage of the red pigment in the red aqueous inkjet ink and the wt % (yellow) is weight percentage of the yellow pigment in the yellow aqueous inkjet ink, wherein all weight percentages (wt %) are based on the total weight of the inkjet ink.

The aqueous inkjet ink according to the present invention preferably consists of the above described cyan, red, yellow and black aqueous inkjet inks. Such an aqueous inkjet ink set allows to have a more than sufficient colour gamut at an acceptable equipment and maintenance cost, especially for a single pass inkjet printer where on average a print width of 1.6 to 2.2 m needs to be covered by print heads for each colour.

If superior quality on graininess is required, one or more aqueous light inkjet inks may be added to the aqueous inkjet ink set. A light inkjet ink preferably has the same pigment as in a corresponding aqueous inkjet ink, but at a much lower concentration. The aqueous inkjet ink set preferably contains one or more aqueous light inkjet inks containing a pigment in an amount of 0.1 to 1.2 wt % of a pigment, wherein the weight percentage (wt %) is based on the total weight of the aqueous light inkjet ink.

However, adding light inkjet inks for each colour cyan, red, yellow and black comes at a substantial economical cost, especially for single pass inkjet printing, and also increases the complexity of the inkjet printer. It was found that the best compromise between improved graininess and economical cost was achieved by adding to the CRYK inkjet ink set only an aqueous light black inkjet ink having a very low amount of black pigment. Such an aqueous light black inkjet ink preferably contains 0.1 to 0.6 wt %, more preferably 0.2 to 0.3 wt % of carbon black pigment, wherein the weight percentage (wt %) is based on the total weight of the aqueous light black inkjet ink.

The static surface tension of the aqueous inkjet ink is preferably in the range of 18 mN/m to 40 mN/m at 25° C., more preferably in the range of about 19 mN/m to about 35 mN/m at 25° C. In these ranges, the ink spreading is optimal for obtaining good image quality on décor paper.

There is no limitation in combining any of the above preferred embodiments with each other.

Average Particle Diameter

The average particle diameter (APD) of a colour pigment in the inkjet inks according to the present invention is determined by a dynamic light scattering technique using a laser having an emission wavelength of 633 nm and measured under a scattering angle of 90 degrees, The principle of dynamic light scattering (DLS) is that fine particles that are in constant random thermal motion, called Brownian motion, diffuse at a speed related to their size, smaller particles diffusing faster than larger particles. To measure the diffusion speed, a speckle pattern produced by illuminating the particles with a laser is observed. The scattering intensity at a specific angle will fluctuate with time, and this is detected using a photomultiplier detector. The intensity changes are analyzed with a digital autocorrelator, which generates a correlation function. This curve is analyzed to give the size and the size distribution.

An important parameter influencing the average particle size measured is the scattering angle used to measure the ink sample. In the present invention, it is essential that the ink sample is measured under a scattering angle of 90 degrees. A suitable DLS apparatus for determining the APD is a Nicomp™ 380.

Other DLS apparatuses may use different scattering angles to determine the APD. For example, an average particle size measured as 201 nm under a scattering angle of 90 degrees becomes an average particle size of 156 nm when measured under a scattering angle of 173 degrees. For example, a Malvern™ Zetasizer Nano S measures under a scattering angle of 173 degrees.

The speed of Brownian motion is also influenced by the temperature. Therefore, precision temperature control is essential for accurate size measurement. In the present invention, the average particle size is preferably determined at 20° C.

Colour Pigments

For reasons of light fastness of the decorative panels, the colorants in the aqueous inkjet inks are colour pigments. Organic and/or inorganic pigments may be used, but preferably organic colour pigments are used because they allow to maximize colour gamut. A single pigment or a mixture of pigments may be used in the aqueous inkjet inks.

The colour pigments may be chosen from those disclosed by HERBST, Willy, et al. Industrial Organic Pigments, Production, Properties, Applications. 3rd edition. Wiley-VCH, 2004. ISBN 3527305769.

The colour pigment for the red aqueous inkjet ink preferably includes a red pigment selected from the group consisting of C.I. Pigment Red 122, C.I. Pigment Red 176, C.I. Pigment Red 188, C.I. Pigment Red 207, C.I. Pigment Red 242, C.I. Pigment Red 254, C.I. Pigment Red 272 and mixed crystals thereof. More preferably the red pigment is selected from the group consisting of C.I. Pigment Red 122, C.I. Pigment Red 176, C.I. Pigment Red 207, C.I. Pigment Red 254 and mixed crystals thereof.

In a particularly preferred embodiment, the red pigment is C.I. Pigment Red 254 or a mixed crystal thereof. Most preferably, the pigment in the aqueous red inkjet ink consists of C.I. Pigment Red 254.

The colour pigment for the yellow aqueous inkjet ink preferably includes a yellow pigment selected from the group consisting of C.I. Pigment Yellow 83, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof. More preferably the yellow pigment is selected from the group consisting of C.I. Pigment Yellow 110, C.I. Pigment Yellow 150, C.I. Pigment Yellow 151, C.I. Pigment Yellow 180, C.I. Pigment Yellow 181 and mixed crystals thereof.

In a particularly preferred embodiment, the yellow pigment is C.I. Pigment Yellow 150 or a mixed crystal thereof. Most preferably, the pigment in the aqueous red inkjet ink consists of C.I. Pigment Yellow 150.

The colour pigment for the cyan aqueous inkjet ink preferably includes a cyan pigment selected from C.I. Pigment Blue 15:3 and C.I. Pigment Blue 15:4, more preferably C.I. Pigment Blue 15:3.

A particularly preferred aqueous inkjet ink set is an ink set, wherein the red aqueous inkjet ink contains C.I. Pigment Red 254 or a mixed crystal thereof; wherein the yellow aqueous inkjet ink contains C.I Pigment Yellow 150 or a mixed crystal thereof; and wherein the beta-copper phthalocyanine pigment is C.I. Pigment Blue 15:3.

These colour pigments are readily available from commercial sources, such CLARIANT and SUN CHEMICAL.

For the black ink, suitable carbon black pigments are Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from EVONIK, MA8 from MITSUBISHI CHEMICAL Co.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions Also mixtures of pigments may be used. For example, the black aqueous inkjet ink may include a carbon black pigment and at least one pigment selected from the group consisting of a blue pigment, a cyan pigment, magenta pigment and a red pigment. It was found that such a black inkjet ink allowed easier and better colour management for wood colours, as it produces a more neutral black colour.

The pigment particles in the pigmented inkjet ink should be sufficiently small to permit free flow of the ink through the inkjet printing device, especially at the ejecting nozzles. Hence, is desirable to filter the aqueous inkjet inks to eliminate oversizers.

Polymeric Dispersants

The red aqueous inkjet ink contains a polymeric dispersant and preferably also the other aqueous inkjet inks contain a polymeric dispersant for dispersing the pigment.

One or more aqueous inkjet inks may contain a dispersion synergist to improve the dispersion quality and stability of the ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable commercial dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the cyan, red and black aqueous inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

For dispersing C.I. Pigment Yellow 150 and mixed crystals thereof, the polymeric dispersant is preferably an acrylic block copolymer dispersant, as very good ink stability has been observed with such a polymeric dispersant. A commercial example is Dispex™ Ultra PX 4575 from BASF.

Surfactants

The aqueous inkjet inks preferably contain at least one surfactant. The surfactant(s) can be anionic, cationic, non-ionic, or zwitter-ionic and are usually added in a total quantity less than 1.0 wt % based on the total weight of the inkjet ink and particularly in a total quantity less than 0.3 wt % based on the total weight of the inkjet ink. The total quantity above is expressed as dry solids.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants, such as fluorinated hydrocarbons.

A particularly preferred commercial fluorosurfactant is Capstone™ FS3100 from DU PONT.

In a preferred embodiment of the aqueous inkjet ink, the surfactant is a fluorosurfactant, more preferably an alkoxylated fluorosurfactant, and most preferably an alkoxylated fluorosurfactant containing a sulfonic acid group or a salt thereof.

Particularly preferred is an alkoxylated fluorosurfactant according to Formula (I):

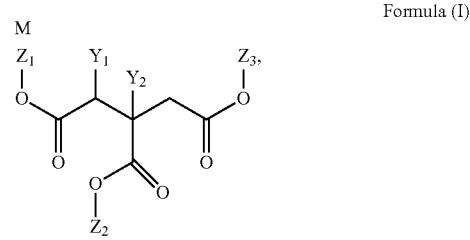

Formula (I)

wherein $Z_1$, $Z_2$ and $Z_3$ are, independently of one another, groups of the structure $R(O(CR_1R_2)_c—(CR_3R_4)_d)_e—$, branched alkyl groups, or unbranched alkyl groups, with the proviso that at least one of $Z_1$, $Z_2$ and $Z_3$ represents a group of the structure $R(O(CR_1R_2)_c—(CR_3R_4)_d)_e—$;

indices c and d are, independently of one another, 0 to 10, with the proviso that c and d are not simultaneously 0;

e is 0 to 5;

R is a branched or unbranched, fluorine-containing alkyl radical;

R1 to R4 are, independently of one another, hydrogen, a branched alkyl group, or an unbranched alkyl group;

Y1 is an anionic polar group and Y2 is a hydrogen atom, or vice versa; and

X is a cation, preferably a cation selected from the group $Na^+$, $Li^+$, $K^+$ and $NH_4^+$.

In a preferred embodiment, R1 to R3 represents hydrogen and R4 represents a methyl group, and more preferably the anionic polar group is a sulfonic acid group or a salt thereof.

Particularly preferred examples of alkoxylated fluorosurfactants according to Formula (I) are shown in Table 1.

TABLE 1

FS-1
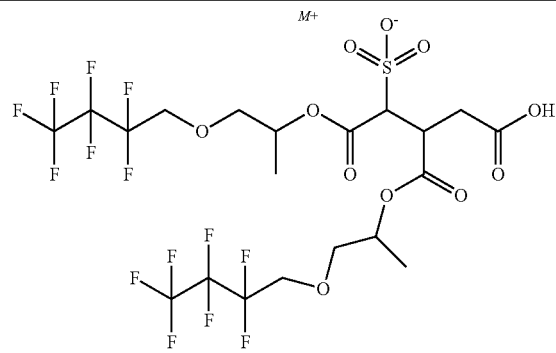

FS-2
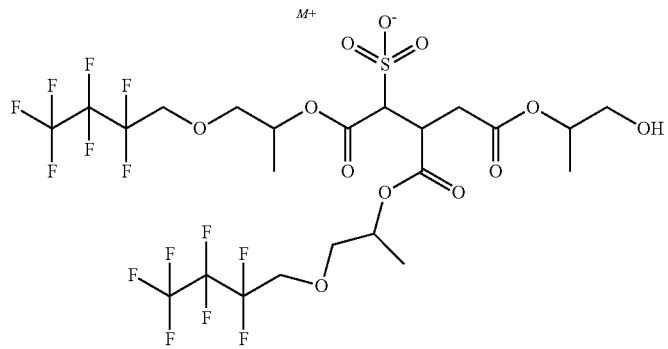

FS-3
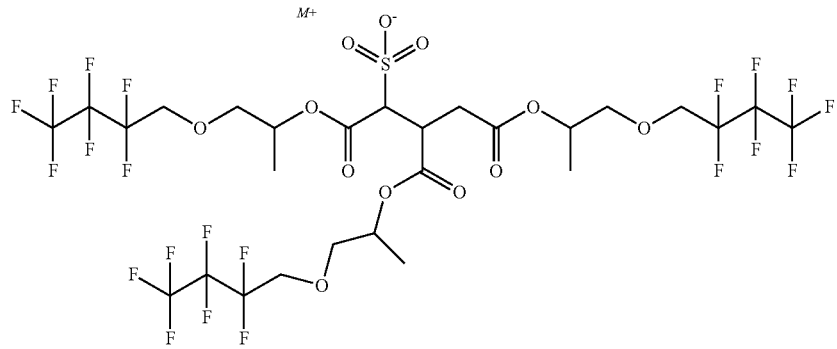

FS-4
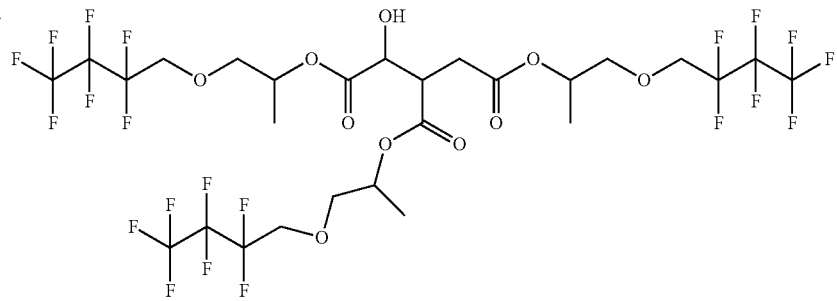

Biocides

Suitable biocides for the aqueous inkjet inks used in the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL, Proxel™ K and Proxel™ Ultra 5 available from ARCH UK BIOCIDES and Bronidox™ available from COGNIS.

A particularly preferred biocide is a 1,2-benzisothiazolin-3-one based biocide.

A biocide is preferably added in an amount of 0.001 to 3.0 wt %, more preferably 0.01 to 1.0 wt %, each based on the total weight of the aqueous inkjet ink.

Humectants

The aqueous inkjet ink preferably contains a humectant.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols. Preferred humectants are 2-pyrrolidone, glycerol and 1,2- hexanediol, the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH-Adjusters

The aqueous inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanol amine and 2-amino-2-methyl-1-propanol. Preferred pH adjusters are triethanol amine, NaOH and $H_2SO_4$.

The pH is preferably adjusted to a value between 7.5 and 10.0, more preferably between 8.0 and 9.0; the latter pH range has been observed to result in an improved ink stability and an optimal compatibility with most inkjet print heads.

Manufacturing Methods of Inkjet Ink Sets

Another aspect of the invention is a method of manufacturing an inkjet ink set as described above including the steps of:

a) preparing a red pigment dispersion by milling an aqueous composition containing a red pigment R and a polymeric dispersant P in a mill for a residence time of no more than 50 minutes, preferably no more than 25 minutes; and b) diluting the red pigment dispersion to a red aqueous inkjet ink by adding components including water and/or organic solvents;

characterized in that the milling is performed at a weight ratio RIP of red pigment R to polymeric dispersant P that complies with $1.2 < R/P < 3.0$.

The residence time in the present invention represents the time that a pigment dispersion is actually milled in a mill. This is basically a volumetric issue. A mill has a defined internal volume, and as new pigment dispersion is fed into the mill, this new pigment dispersion displaces the pigment dispersion already in the mill. The volumetric capacity of a mill is the volume of the mill at rest where the pigment dispersion just reaches the discharge level. From this volume, the volume of the grinding media is to be subtracted. This represents the unit capacity. In order to obtain the residence tire, the unit capacity is divided by the volumetric feed rate of the pigment dispersion per time. For example, if the unit capacity is ½ cubic meter and the feed rate of pigment dispersion is 6 cubic meters per hour, then the residence time is about 5 minutes.

A preferred embodiment of an apparatus for making a pigment dispersion includes a mixing apparatus and a milling apparatus. Mixing apparatuses nay include a pressure kneader, an open kneader, a planetary mixer, a dissolver, and a Dalton Universal Mixer. Suitable milling apparatuses are a ball mill, a pearl mill, a colloid mill, a high-speed disperser, double rollers, a bead mill, a paint conditioner, a wet milling high pressure homogenizer (e.g. Star Burst from SUGINO) and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The contents of the milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media.

The milling time can vary widely and depends upon the pigment, selected mechanical means and residence conditions, the initial and desired final particle size, etc.

After milling is completed, the milling media is separated from the milled pigment dispersion using conventional separation techniques, such as by filtration, sieving through a mesh screen, and the like. Often the sieve is built into the mill, e.g. a bead mill. The milled pigment concentrate is preferably separated from the milling media by filtration.

In general, it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application. Viscosity can also be adjusted by using low molecular weight polyethylene glycols, for example having an average numerical molecular weight between 200 and 800. An example is PEG 200 from CLARIANT.

Uses of the Aqueous Inkjet Ink Sets

The aqueous inkjet ink set as described above is used for manufacturing decorative panels by:

jetting a colour image with one or more aqueous inkjet inks of the aqueous inkjet ink set on a paper substrate including one or more ink receiving layers;

drying the jetted colour image; and impregnating the paper substrate by a thermosetting resin. The thermosetting resin used is preferably a melamine resin. The paper substrate is preferably impregnated by a thermosetting resin after inkjet inks have been jetted and dried on the paper substrate. The thermosetting resin impregnated paper substrate is then preferably heat pressed between a core layer and a protective layer and cut into a decorative panel selected from the group consisting of flooring, kitchen, furniture and wall panels. However, in another embodiment for making furniture and wall panels, the protective layer may be omitted.

The aqueous inkjet ink set may be used in a multi-pass inkjet printer, but for reasons of productivity the jetting of the colour image on the substrate is preferably performed by a single-pass printing process.

The paper substrate preferably includes multiple ink receiving layers with an outermost ink receiving layer containing no inorganic pigment or an amount of inorganic pigment smaller than that of one or more ink receiving layers located between the paper substrate and the outermost ink receiving layer. The advantage is that the printing reliability is enhanced. For fast drying, the ink receiving layers contain high amounts of inorganic pigments, such as fumed silica, which can create dust problems due to the transporting of the paper substrate in the inkjet printer, especially in a single pass inkjet printing pass where very high speeds for transporting the paper substrate below the print heads are used. This dust problem is reduced by having an outermost ink receiving layer containing no or only a small amount of inorganic pigments.

The one or more ink receiving layers preferably include an inorganic pigment selected from the group consisting of alumina hydrates, aluminum oxides, aluminum hydroxides, aluminum silicates, and silica's. The one or more ink receiving layers contain a polymeric binder preferably selected from the group consisting of polyvinylalcohol, a vinylalcohol copolymer or modified polyvinyl alcohol Preferably, the one or more ink receiving layers contain a crushing agent selected from the group consisting of a cationic polymeric binder, a cationic inorganic pigment and multivalent salts.

In one embodiment, the paper substrate is a coloured paper substrate, more preferably a bulk coloured paper substrate. The use of a coloured paper substrate reduces the amount of inkjet ink required to form the colour image.

It was observed that improved image quality is obtained when the inkjet printing is performed in a manner that the wood nerves in the colour image are extending in a direction substantially corresponding to the inkjet printing direction. For a single pass inkjet printing process, the inkjet printing direction is the transport direction of the paper substrate. In a multi-pass inkjet printing process, the inkjet printing direction is the scanning direction of the print heads.

In a preferred embodiment, the aqueous inkjet ink set is used to manufacture decorative panels including a tongue and a groove capable of achieving a glue less mechanical join between decorative panels.

The aqueous inkjet ink set is preferably used in an inkjet printing method being part of a DPL process, wherein the decorative layer is taken up in a stack to be pressed with a core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed colour image with the aqueous inkjet ink set, wherein the thermosetting resin may be a colored thermosetting resin to reduce the amount of inkjet ink to be printed.

In a preferred embodiment, the aqueous inkjet ink set is used to manufacture decorative panels including a relief in at least the protective layer, more preferably by means of a short cycle embossing press. The embossing preferably takes place at the same time that the core layer, the decorative layer and the protective layer, and preferably also one or more balancing layers, are pressed together. The relief in the protective layer preferably corresponds to the colour image.

Preferably the relief comprises portions that have been embossed over a depth of more than 0.5 m, or even more than 1 mm, with respect to the global upper surface of the decorative panel. The embossments may extend into the decorative layer.

The balancing layer of a decorative panel is preferably planar. However, a relief might be applied in the balancing layer(s) for improving gluing down of the panels and/or for improved slip resistance and/or for improved, i.e. diminished sound generation or propagation.

It should be clear that the use of more than one press treatment is also advantageous for the manufacturing of decorative surfaces. Such technique could be used for the manufacturing of any panel that comprises on the one hand a wear resistant protective layer on the basis of a thermosetting synthetic material, possibly a carrier sheet such as paper, and hard particles, and, on the other hand, one or more layers underlying the wear resistant protective layer on the basis of thermosetting synthetic material. The underlying layers may comprise a decorative layer, such as an inkjet printed paper provided with thermosetting resin. As a core layer, such panel might essentially comprise a board material with a density of more than 500 kg/m$^3$, such as an MDF or HDF board material. The manufacturing panels with a plurality of press treatments is preferably put in practice with the so-called DPL panels (Direct Pressure Laminate). In the latter case, during a first press treatment, at least the decorative layer provided with thermosetting resin, is cured and attached to the core material, preferably an MDF or HDF board material, whereby a whole is obtained of at least the decorative layer and the board material, and possibly a balancing layer at the side of the board opposite the decor layer. During a second press treatment, the wear resistant layer is cured and attached to the obtained whole.

In another embodiment, the method for manufacturing a decorative surface uses the aqueous inkjet ink set according to the present invention in combination with the methodology disclosed by US 2011008624 (FLOORING IND), wherein the protective layer includes a substance that hardens under the influence of ultraviolet light or electron beams.

Decorative Panels

The decorative panels are preferably selected from the group consisting of kitchen panels, flooring panels, furniture panels, ceiling panels and wall panels.

A decorative panel, illustrated by a flooring panel having also a tongue and groove join in FIG. 1, includes preferably at least a core layer, a decorative layer and a protective layer. In order to protect the colour image of the decorative layer against wear, a protective layer is applied on top of the decorative layer. A balancing layer may also be applied at the opposite side of the core layer to restrict or prevent possible bending of the decorative panel. The assembly into a decorative panel of the balancing layer, the core layer, the decorative layer and the protective layer is preferably performed in the same press treatment of preferably a DPL process (Direct Pressure Laminate).

In a preferred embodiment of decorative panels, tongue and groove profiles are milled into the side of individual decorative panels which allow them to be slid into one another. The tongue and grove join ensures, in the case of flooring panels, a sturdy floor construction and protects the floor, preventing dampness from penetrating.

In a more preferred embodiment, the decorative panels include a tongue and a groove of a special shape, which allow them to be clicked into one another. The advantage thereof is an easy assembly requiring no glue. A shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative surfaces as exemplified by EP 1567334 A (FLOORING IND).

The top surface of the decorative panel is preferably provided with a relief matching the colour image, such as for example the wood grain, cracks and nuts in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

In a preferred embodiment, the decorative panels for flooring are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Use can also be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres, which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably also the protective layer and the optional balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer that can cause undesired colour effects on the colour image.

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to print the colour image. For example, a light brown or grey paper may be used for printing a wood motif as colour image in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having high porosity, and made from clean low kappa hardwood Kraft of good uniformity.

If the protective layer includes a paper, then a paper is used which becomes transparent or translucent after resin impregnation so that the colour image in the decorative layer can be viewed.

The above papers may also be used in the balancing layer.

Ink Receiving Layers

One or more ink receiving layers are present on the paper substrate of the decorative layer for enhancing the image quality obtained by inkjet printing.

The ink receiving layer(s) may be a purely polymer based ink receiving layer, but preferably contain an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink receiving layer(s) have a total dry weight between 2.0 g/m$^2$ and 10.0 g/m$^2$, more preferably between 3.0 and 6.0 g/m$^2$.

In a preferred embodiment, the ink receiving layer(s) include a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink receiving layer(s) include a polymeric binder, preferably a water soluble polymeric binder (water soluble meaning>1 g/L water at 25° C.), which has a hydroxyl group as a hydrophilic structural unit, e.g. a polyvinyl alcohol.

A preferred polymer for the ink receiving layer(s) is a polyvinylalcohol (PVA), a vinylalcohol copolymer or modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink receiving layer(s) is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

The inorganic pigment is preferably selected from the group consisting of alumina hydrates, aluminum oxides, aluminum hydroxides, aluminum silicates, and silica's.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 6 μm or less.

A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH Useful cationic aluminum oxide (alumina) types include α-$Al_2O_3$ types, such as NORTON E700, available from Saint-Gobain Ceramics & Plastics, Inc, and γ-$Al_2O_3$ types, such as ALUMINUM OXID C from EVONIK.

Other useful inorganic pigments include aluminum trihydroxides such as Bayerite, or α-$Al(OH)_3$, such as PLURAL BT, available from Sasol, and Gibbsite, or γ-$Al(OH)_3$, such as MARTINAL grades and MARTIFIN grades from Martinswerk GmbH, MICRAL grades from JM Huber company; HIGILITE grades from Showa Denka K.K.

Another preferred type of inorganic pigment is silica, which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Useful types include AEROSIL OX50 (BET surface area 50±15 $m^2/g$, average primary particle size 40 nm, $SiO_2$ content >99.8%, $Al_2O_3$ content <0.08%), AEROSIL MOX170 (BET surface area 170 $g/m^2$, average primary particle size 15 nm, $SiO_2$ content >98.3%, $Al_2O_3$ content 0.3-1.3%), AEROSIL MOX80 (BET surface area 80±20 $g/m^2$, average primary particle size 30 nm, $SiO_2$ content >98.3%, $Al_2O_3$ content 0.3-1.3%), or other hydrophilic AEROSIL grades available from Degussa-Hüls AG, which may give aqueous dispersions with a small average particle size (<500 nm).

Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica.

A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles used in the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity.

In a further preferred embodiment, said ink receiving layer can be further crosslinked. Any suitable crosslinker known in the prior art can be used. Boric acid is particularly preferred as crosslinker for the ink receiving layer according to the present invention.

The ink receiving layer(s) may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink receiving layer(s) may consist of a single layer or of two, three or more layers even having a different composition.

The ink receiving layer(s) can be coated onto the support by any conventional coating technique, such as dip coating, knife coating, extrusion coating, spin coating, slide hopper coating and curtain coating.

Alternatively, the ink receiving layer(s) can also be applied by a printing technique, such as flexographic printing, screen printing, rotogravure printing and inkjet printing. The inkjet printer preferably employs valvejet printing heads.

In a preferred embodiment, the one or more ink receiving layers contain a crushing agent selected from the group consisting of a cationic polymeric binder, a cationic inorganic pigment and water-soluble polyvalent cation salts.

Preferred cationic pigments include alumina hydrates, aluminum oxides, aluminum hydroxides, aluminum silicates, and cationically modified silica's, such as cationically modified fumed silica, Preferred cationic polymers include cationic type polyvinyl alcohols, such as the cationic polyvinyl alcohol grades from KURARAY, such as POVAL CM318™, POVAL C506™, POVAL C118™, and GOHSEFIMER K210™ from NIPPON GOHSEI.

Another preferred cationic polymer is poly(diallyldimethylammonium chloride) or, in short, a poly(DADMAC). These compounds are commercially available from several companies, e.g. ALDRICH, NALCO, CIBA, NITTO BOSEKI CO., CLARIANT, BASF and EKA CHEMICALS.

Other suitable cationic polymers include DADMAC copolymers such a copolymers with acrylamide, e.g NALCO™ 1470 trade mark of ONDEO NALCO or PAS-J-81™, available NITTO BOSEKI CO., such as copolymers of DADMAC with acrylates, such as Nalco 8190™, available from ONDEO NALCO; copolymers of DADMAC with $SO_2$, such as PAS-A-1 or PAS-92, trademarks of NITTO BOSEKI CO., copolymer of DADMAC with maleic acid, e.g. PAS-410™ available from NITTO BOSEKI CO., copolymer of DADMAC with diallyl(3-chloro-2-hydroxypropyl) amine hydrochloride, eg. PAS-880™, available NITTO BOSEKI CO., dimethylamine-epichlorohydrine copolymers, e.g. Nalco 7135™, available from ONDEO NALCO or POLYFIX 700, trade name of SHOWA HIGH POLYMER Co.; other POLYFIX grades which could be used are POLYFIX 601, POLYFIX 301, POLYFIX 301A, POLYFIX 250WS, and POLYFIX 3000; NEOFIX E-117, trade name of NICCA CHEMICAL CO., a polyoxyalkylene polyamine dicyanodiamine, and REDIFLOC 4150, trade name of EKA CHEMICALS, a polyamine; MADAME (methacrylatedimethylaminoethyl=dimethylaminoethyl methacrylate) or MADQUAT (methacryloxyethyltrimethylammoniur chloride) modified polymers, e.g. ROHAGIT KL280, ROHAGIT 210, ROHAGIT SL144, PLEX 4739L, PLEX 3073 from RÖHM, DIAFLOC KP155 and other DIAFLOC products from DIAFLOC CO., and BMB 1305 and other BMB products from EKA CHEMICALS; cationic epichlorohydrin adducts such as POLYCUP 171 and POLYCUP 172, trade names from HERCULES CO.; from Cytec industries: CYPRO products, e.g. CYPRO 514(5151516, SUPERFLOC 507/521/567; cationic acrylic polymers, such as ALCOSTAT 567™, available from CIBA, cationic cellulose derivatives such as CELQUAT L-200, H-100, SC-240C, SC-230M, trade names of STARCH & CHEMICAL CO., and QUATRISOFT LM200, UCARE polymers JR125, JR400, LR400, JR30M. LR30M and UCARE polymer LK; fixing agents from CHUKYO EUROPE PALSET JK-512, PALSET JK512L, PALSET JK8-12, PALSET JK-220, WSC-173, WSC-173L, PALSET JK-320, PALSET JK-320L and PALSET JK-350; polyethyleneimine and copolymers, e.g. LUPASOL, trade name of BASF AG; triethanolamine-titanium-chelate, e.g. TYZOR, trade name of DU PONT CO.; copolymers of vinylpyrrolidone such as VIVIPRINT 111, trade name of ISP, a methacrylamido propyl dimethylamine copolymer; with dimethylaminoethylmethacrylate such as COPOLYMER 845 and COPOLYMER 937, trade names of ISP; with vinylimidazole, e.g. LUVIQUAT CARE, LUVITEC 73W, LUVITEC VPI55 KI8P, LUVITEC VP155 K72W, LUVIQUAT FC905, LUVIQUAT FC550, LUVIQUAT HM522, and SOKALAN HP56, all trade names of BASF AG; polyamidoamines, e.g. RETAMINOL and NADAVIN, trade marks of BAYER AG; phosphonium compounds such as disclosed in EP 609930 and other cationic polymers such as NEOFIX RD-5™, available from NICCA CHEMICAL CO.

Preferred crushing agents include a water-soluble polyvalent cation salt. The water-soluble polyvalent cation salt is a water-soluble salt that contains a polyvalent metal cation. The polyvalent cation salt is preferably a salt containing a polyvalent metal cation and being able to dissolve to 1% by weight or more in water at 20° C. Examples of polyvalent metal cations include divalent cations such as magnesium, calcium, strontium, barium, nickel, zinc, copper, iron, cobalt, tin or manganese ions, trivalent cations such as aluminum, iron or chromium ions, tetravalent cations such as titanium or zirconium ions, and complex ions thereof. There are no particular limitations on the anion that forms a salt with the polyvalent metal cation, and may be an anion of an inorganic acid or organic acid. Examples of inorganic acids include hydrochloric acid, nitric acid, phosphoric acid, sulfuric acid, boric acid and hydrofluoric acid. Examples of organic acids include formic acid, acetic acid, lactic acid, citric acid, oxalic acid, succinic acid and organic sulfonic acids. Particularly preferred water-soluble polyvalent cation salts include $CaCl_2$ and $MgCl_2$.

In the present invention, the water-soluble polyvalent cation salt is preferably a calcium salt such as calcium chloride, calcium formate, calcium nitrate or calcium acetate. Calcium chloride or calcium nitrate is preferable from the viewpoint of chemical cost. The content of the water-soluble polyvalent cation salt in the coating layer is preferably 01 to 6.0 wt % based on the dry weight of ink receiving layer.

Thermosetting Resins

The thermosetting resin is preferably selected from the group consisting of melamine-formaldehyde based resins, ureum-formaldehyde based resins and phenol-formaldehyde based resins.

Other suitable resins for impregnating the paper are listed in [0028] of EP 2274485 A (HUELSTA).

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, resulting in adhesion problems.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin that at least the paper core is satisfied with the resin. Such satisfaction can be reached when an amount of resin is provided that corresponds to at least 1.5 or at least 2 times the paper weight.

Preferably the resin provided on said paper is in a so-called B-stage. Such B-stage exists when the thermosetting resin is not completely cross linked.

Preferably the resin provided on said paper has a relative humidity lower than 15%, and still better of 10% by weight or lower.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Decorative Layers

The decorative layer includes a thermosetting resin impregnated paper and a colour image printed thereon by inkjet. In the assembled decorative panel, the colour image is preferably located on the resin impregnated paper on the opposite side than the side facing the core layer.

A decorative panel, like a floor panel, preferably has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

A colour image is obtained by jetting and drying one or more aqueous inkjet inks of an aqueous inkjet ink set upon the one or more ink receiving layers.

There is no real restriction on the content of the colour image. The colour image may also contain information such as text, arrows, logo's and the like. The advantage of inkjet printing is that such information can be printed at low volume without extra cost, contrary to gravure printing.

In a preferred embodiment, the colour image is a wood reproduction or a stone reproduction, but it may also be a fantasy or creative image, such as an ancient world map or a geometrical pattern, or even a single colour for making, for example, a floor consisting of black and red tiles or a single colour furniture door.

An advantage of printing a wood colour image is that a floor can be manufactured imitating besides oak, pine and beech, also very expensive wood like black walnut which would normally not be available for house decoration.

An advantage of printing a stone colour image is that a floor can be manufactured which is an exact imitation of a stone floor, but without the cold feeling when walking barefooted on it.

Protective Layers

A protective layer is applied above the printed colour image after printing, e.g. by way of an overlay, i.e. a resin provided carrier, or a liquid coating, preferably while the decor layer is laying on the core layer, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725289 C (ITT MFG ENTERPRISES) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 $g/m^2$ and 100 $g/m^2$, preferably 2 $g/m^2$ to 50 $g/m^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles in the protective layer may be determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 µm are preferred. Preferably an amount of such particles of between 1 and 40 g/m² is applied above the printed image. An amount lower than 20 g/m² can suffice for the lower qualities.

If the protective layer includes a paper, then it preferably has a paper weight of between 10 and 50 g/m². Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed image involves a press treatment. Preferably a temperature above 150° C. is applied in the press treatment, more preferably between 180° and 220° C., and a pressure of more than 20 bar, more preferably between 35 and 40 bar.

In a preferred embodiment, the decorative panel is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour image or below the colour image and stay in the zone where they are most effective, namely essentially above the colour image. This makes it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 µm or less, or even of 5 µm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer, that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Inkjet Printers

The aqueous inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method according to the present invention is not restricted to piezoelectric inkjet printing. Other inkjet print heads can be used and include various types, such as a continuous type.

In a multi-pass inkjet printing process, the inkjet print head scans back and forth in a transversal direction across the moving ink-receiver surface. Sometimes the inkjet print head does not print on the way back. However, bi-directional printing is preferred for obtaining a high area throughput. Another preferred printing method is by a "single pass printing process", which can be performed by using page wide inkjet print heads or multiple staggered inkjet print heads, which cover the entire width of the ink-receiving surface. In a single pass printing process, the inkjet print heads usually remain stationary while the substrate surface is transported under the inkjet print heads. Very high productivity can be obtained by single pass inkjet printing, which is key in an industrial environment.

EXAMPLES

Materials

All materials used in the following examples were readily available from standard sources such as Aldrich Chemical Co. (Belgium) and Acros (Belgium) unless otherwise specified. Where used, water is demineralised water.

PB15:3 is an abbreviation used for Sunfast™ Blue 15:3, a C.I. Pigment Blue 15:3 pigment from SUN CHEMICAL.

PR254 is the abbreviation for C.I. Pigment Red 254 for which PV Fast™ Red D36 VP2897 from CLARIANT was used.

PY150 is an abbreviation used for Fanchon™ Yellow 150:B022, a C.I. Pigment Yellow 150 from SUN CHEMICAL.

PBL7 is an abbreviation used for Printex™ 90, a carbon black pigment from EVONIK.

Edaplan is an abbreviation used for Edaplan™ 482, a polymeric dispersant from MUNZING.

Dispex is an abbreviation used for the acrylic block copolymer dispersant available as Dispex™ Ultra PX 4575 (40% aqueous solution) from BASF.

PEG 200 is a polyethylene glycol having an average molecular weight of 200 from CLARIANT.

TEA is triethanol amine.

Proxel is an abbreviation used for a 5% aqueous solution of 1,2-benzisothiazolin-3-one available as Proxel™ K from YDS CHEMICALS NV.

T72 is a 70 g/m² décor paper available from UNILIN BVBA that is coated with 2 ink receiving layers with an outermost ink receiving layer containing an amount of inorganic pigment smaller than that of the ink receiving layer located between the paper substrate and the outermost ink receiving layer.

Measurement Methods

1. Average Particle Diameter (APD)

An ink sample is diluted with demineralized water to a pigment concentration of 0.002 wt %. The average particle size of pigment particles is determined with a Nicomp™ 380 Particle Sizing System based upon the principle of dynamic light scattering using a laser having an emission wavelength of 633 nm and measured under a scattering angle of 90 degrees.

2. Viscosity

The viscosity of an inkjet ink was measured, using a Brookfield DV-II+ viscometer at 32° C. at a shear rate of 1,000 s$^{-1}$.

3. Adhesion

The adhesion is evaluated by cutting with a knife a raster pattern in the laminate sample and observe the delamination between the top protective layer and the printed paper.

The evaluation was made in accordance with the evaluation values described in Table 2.

TABLE 2

| Evaluation value | Observation |
|---|---|
| 0 | The edges of the cuts are completely smooth: none of the squares of the lattice is detached (=perfect adhesion). |
| 1 | Detachment of small flakes of the coating at the intersections of the cuts. A cross-cut area not greater than 5% is affected. |
| 2 | The coating has flaked along the edges and/or at the intersections of the cuts. A cross-cut area greater than 5%, but not significantly greater than 15%, is affected. |
| 3 | The coating has flaked along the edges of the cuts partly or wholly in large ribbons, and/or it has flaked partly or wholly on different parts of the squares. A cross-cut area significantly greater than 15%, but not significantly greater than 35%, is affected. |
| 4 | The coating has flaked along the edges of the cuts in large ribbons, and/or some of the squares has detached partly or wholly. A cross-cut area significantly greater than 35%, but not significantly greater than 65%, is affected. |
| 5 | Any degree of flaking that cannot even be classified by classification 4. |

Example 1

This example illustrates aqueous inkjet ink sets suitable for printing colour images for flooring laminates that exhibit good adhesion after lamination.

Preparation of Concentrated Pigment Dispersions CPK, CPC and CPY

The concentrated aqueous pigment dispersions CPK, CPC and CPY were made in the same manner by mixing a composition according to Table 4 containing respectively a black, cyan and yellow colour pigment for 30 minutes with a Disperlux™ mixer.

TABLE 4

| wt % of component | CPK (Black) | CPC (Cyan) | CPY (Yellow) |
|---|---|---|---|
| PB7 | 15.00 | — | — |
| PB15:3 | — | 15.00 | — |
| PY150 | — | — | 15.00 |
| Edaplan | 15.00 | 15.00 | — |
| Dispex | — | — | 15.00 |
| Water | 70.00 | 70.00 | 70.00 |

Each concentrated aqueous pigment dispersion was then milled using a Dynomill™ KDL with 0.4 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The resulting concentrated aqueous pigment dispersions CPK, CPC and CPY served as the basis for the preparation of respectively the black, cyan and yellow inkjet inks.

Preparation of Concentrated Pigment Dispersions CPR-1 to CPR-16

The concentrated aqueous red pigment dispersions CPR-1 to CPR-16 were made in the same manner by mixing a composition according to Table 5 for 30 minutes using a Disperlux™ mixer.

TABLE 5

| Component | Concentration (wt %) |
|---|---|
| PR254 | wt % R (see Table 6) |
| Edaplan | wt % P (see Table 6) |
| Water | to complete 100.00 wt % |

Each concentrated aqueous pigment dispersion was then milled using a Dynomill™ ECM with 0.4 mm yttrium stabilized zirconium beads YTZ™ Grinding Media (available from TOSOH Corp.). The mill was filled to half its volume with the grinding beads and the dispersion was milled for a residence time in the mill according to Table 6. Some pigment dispersions were made several times using different batches of PR254 in order to have an idea of the reproducibility. After milling, the dispersion is separated from the beads by filtration. The concentrated aqueous pigment dispersion served as the basis for the preparation of the red inkjet inks.

TABLE 6

| Dispersion | Residence time (min) | wt % R | wt % P |
|---|---|---|---|
| CPR-1 | 28 | 15.00 | 15.00 |
| CPR-2 | 55 | 25.00 | 12.50 |
| CPR-3 | 56 | 25.00 | 12.50 |
| CPR-4 | 41 | 25.00 | 12.50 |
| CPR-5 | 28 | 25.00 | 12.50 |
| CPR-6 | 28 | 25.00 | 12.50 |
| CPR-7 | 30 | 25.00 | 12.50 |
| CPR-8 | 28 | 25.00 | 12.50 |
| CPR-9 | 28 | 25.00 | 12.50 |
| CPR-10 | 28 | 25.00 | 12.50 |
| CPR-11 | 15 | 25.00 | 12.50 |
| CPR-12 | 15 | 25.00 | 12.50 |
| CPR-13 | 15 | 25.00 | 12.50 |
| CPR-14 | 10 | 25.00 | 12.50 |
| CPR-15 | 10 | 25.00 | 12.50 |
| CPR-16 | 10 | 25.00 | 12.50 |

Preparation of Aqueous Inkjet Ink Sets

Each of the inkjet inks C, R1, R2, Y and K were prepared in the same manner by diluting the corresponding concentrated pigment dispersions with the other ink ingredients according to Table 7 expressed in wt % based on the total weight of the ink. The red inkjet ink R1 was made using the concentrated pigment dispersion CPR-1, while 15 other red inkjet inks were made according to R2 using the concentrated pigment dispersion CPR-2 to CPR-16. This resulted in 16 CRYK inkjet ink sets. The component TEA was used to obtain a desired pH of 8.5 of the aqueous inkjet ink. Water was added to complete the ink to 100.00 wt %. The viscosity was determined for each inkjet ink and is shown in Table 7, together with the pigment concentration in each inkjet ink.

TABLE 7

| wt % of ink ingredient | C | R1 | R2 | Y | K |
|---|---|---|---|---|---|
| CPC | 14.67 | — | — | — | — |
| CPR-1 | — | 18.00 | — | — | — |
| CPR-2 to CPR-16 | — | — | 10.80 | — | — |
| CPY | — | — | — | 26.67 | — |
| CPK | — | — | — | — | 20.00 |
| Proxel | 0.20 | 0.20 | 0.20 | 0.20 | 0.20 |
| 1,2-hexanediol | 3.00 | 3.00 | 3.00 | 2.50 | 3.00 |
| Glycerine | 20.00 | 20.00 | 20.00 | 20.00 | 20.00 |
| PEG200 | 14.00 | 13.50 | 13.50 | 6.50 | 12.50 |
| Water | 60.00 | 60.00 | 60.00 | 60.00 | 60.00 |
| Triethanolamine | to pH 8.5 | to pH 8.5 | to pH 8.5 | to pH 8.5 | to pH 8.5 |
| Water to complete to | 100.00 | 100.00 | 100.00 | 100.00 | 100.00 |
| Properties: | | | | | |
| Viscosity at 32° C. (mPa · s) | 5 | 5 | 5 | 5 | 5 |
| wt % of Pigment | 2.20 | 2.70 | 2.70 | 3.85 | 3.00 |

Evaluation and Results

The adhesion properties of different inkjet ink sets were tested on a 70 g/m² décor paper T72, by coating each inkjet ink with a bar coater at a wet layer thickness of 10 μm. After coating, the ink layers were dried for 2 min at 60° C.

The decor paper was then impregnated with an aqueous solution containing 60 wt % of melamine-formaldehyde based resin and dried to a residual humidity of about 8 g/m². A similar assembly was made as shown in FIG. 1, wherein a prepared décor paper was interposed between a MDF core and a protective layer of melamine-formaldehyde resin impregnated paper containing corundum for durability. The assembly was then heat pressed at 195° C. for 22 seconds at a pressure of 60 kg/cm².

The adhesion between the ink layer and the top paper was then assessed via a cross cut test. The averaged adhesion score for each inkjet ink set is shown in Table 8.

TABLE 8

| CRYK Ink set | Dispersion in red ink | Residence time (min) | R/P | APD (nm) | Adhesion |
|---|---|---|---|---|---|
| COMP-1 | CPR-1 | 28 | 1.0 | 110 | 3 |
| COMP-2 | CPR-2 | 55 | 2.0 | 122 | 4 |
| COMP-3 | CPR-3 | 56 | 2.0 | 170 | 3 |
| INV-1 | CPR-4 | 41 | 2.0 | 181 | 2 |
| INV-2 | CPR-5 | 28 | 2.0 | 195 | 2 |
| INV-3 | CPR-6 | 28 | 2.0 | 195 | 1 |
| INV-4 | CPR-7 | 30 | 2.0 | 195 | 2 |
| INV-5 | CPR-8 | 28 | 2.0 | 197 | 2 |
| INV-6 | CPR-9 | 28 | 2.0 | 198 | 2 |
| INV-7 | CPR-10 | 28 | 2.0 | 201 | 2 |
| INV-8 | CPR-11 | 15 | 2.0 | 213 | 1 |
| INV-9 | CPR-12 | 15 | 2.0 | 216 | 1 |
| INV-10 | CPR-13 | 15 | 2.0 | 220 | 1 |
| INV-11 | CPR-14 | 10 | 2.0 | 221 | 1 |
| INV-12 | CPR-15 | 10 | 2.0 | 225 | 1 |
| INV-13 | CPR-16 | 10 | 2.0 | 230 | 1 |

From Table 8, it should be clear that good adhesion was obtained when the red aqueous inkjet ink had a weight ratio R/P of red pigment R to polymeric dispersant P equal to 2.0 and when the average particle diameter APD is larger than 175 nm, while excellent adhesion was obtained if the average particle diameter APD increased further to between 205 and 240 nm.

The jetting performance of all inkjet inks was also tested on a JetXpert™ drop watcher equipped with a Samba™ G3L inkjet print head from FUJIFILM. Stable jetting for 5 minutes of a 100% ink coverage was observed for all inkjet ink sets at 20, 40 and 60 kHz.

REFERENCE SIGNS LIST

TABLE 9

| 1 | Decorative panel |
|---|---|
| 2 | Protective layer |
| 3 | Outermost ink receiving layer |
| 4 | Inner ink receiving layer |
| 5 | Core layer |
| 6 | Jetted and dried colour image |
| 7 | Balancing layer |
| 8 | Tongue |
| 9 | Groove |

The invention claimed is:

1. A method of manufacturing decorative panels, the method comprising:
   (1) jetting a color image with an aqueous inkjet ink set on a paper substrate including one or more ink receiving layers;
   (2) drying the jetted color image; and then
   (3) impregnating the paper substrate by a thermosetting resin,
   wherein the aqueous inkjet ink set comprises:
   a) a cyan aqueous inkjet ink containing a beta-copper phthalocyanine pigment;
   b) a red aqueous inkjet ink containing a red pigment R and a polymeric dispersant P;
   c) a yellow aqueous inkjet ink containing a yellow pigment; and
   d) a black aqueous inkjet ink containing a carbon black pigment,
   wherein the red aqueous inkjet ink has a weight ratio R/P of red pigment R to polymeric dispersant P that complies with 1.2<R/P<3.0,
   wherein the average particle diameter APD of the red pigment R complies with 175 nm<APD<240 nm, as determined by a dynamic light scattering technique using a laser having an emission wavelength of 633 nm and measured under a scattering angle of 90 degrees, and
   wherein the red aqueous inkjet ink contains C.I. Pigment Red 254 or a mixed crystal thereof; and the yellow aqueous inkjet ink contains C.I. Pigment Yellow 150 or a mixed crystal thereof.

2. The method of manufacturing decorative panels of claim 1, wherein the thermosetting resin is selected from the group consisting of melamine-formaldehyde based resins, ureum-formaldehyde based resins, and phenol-formaldehyde based resins.

3. The method of manufacturing decorative panels of claim 1, wherein the jetting of the color image is performed in a single-pass printing process.

4. The method of manufacturing decorative panels of claim 1, wherein the paper substrate includes multiple ink receiving layers with an outermost ink receiving layer containing no inorganic pigment or an amount of inorganic pigment smaller than that of one or more ink receiving layers located between the paper substrate and the outermost ink receiving layer.

5. The method of manufacturing decorative panels of claim 1, wherein the one or more ink receiving layers include an inorganic pigment selected from the group consisting of alumina hydrates, aluminum oxides, aluminum hydroxides, aluminum silicates, and silicas; and a polymeric binder selected from the group consisting of polyvinylalcohol, a vinylalcohol copolymer, and a modified polyvinyl alcohol.

6. The method of manufacturing decorative panels of claim 1, wherein the one or more ink receiving layers contain a crushing agent selected from the group consisting of a cationic polymeric binder, a cationic inorganic pigment, and water-soluble polyvalent cation salts.

7. The method of manufacturing decorative panels as claimed in 1, wherein the thermosetting resin impregnated paper substrate is heat pressed between a core layer and a protective layer and cut into a decorative panel selected from the group consisting of flooring, kitchen, furniture, and wall panels.

8. The method of manufacturing decorative panels as claimed in 1, wherein the cyan aqueous inkjet ink contains 1.5 to 3.0 wt % of the beta-copper phthalocyanine pigment; the red aqueous inkjet ink contains 2.2 to 5.0 wt % of the red pigment; the yellow aqueous inkjet ink contains 3.0 to 5.0 wt % of the yellow pigment; and the black aqueous inkjet ink contains 2.2 to 5.0 wt % of a carbon black pigment,
   wherein the aqueous inkjet ink set optionally contains one or more aqueous light inkjet inks containing a pigment in an amount of 0.1 to 1.2 wt % of a pigment, and
   wherein all the weight percentages (wt %) are based on the total weight of the inkjet ink.

9. The method of manufacturing decorative panels as claimed in 8, wherein the one or more aqueous light inkjet inks include an aqueous light black inkjet ink containing 0.1 to 0.6 wt % of carbon black pigment.

10. The method of manufacturing decorative panels as claimed in 1, wherein the beta-copper phthalocyanine pigment is C.I. Pigment Blue 15:3.

11. The method of manufacturing decorative panels as claimed in 1, wherein the wt % (cyan) of the cyan pigment in the cyan aqueous inkjet ink, the wt % (red) of the red pigment in the red aqueous inkjet ink, and the wt % (yellow) of the yellow pigment in the yellow aqueous inkjet ink comply with the relationship: wt % (cyan)<wt % (red)<wt % (yellow).

* * * * *